United States Patent
Lingam et al.

(10) Patent No.: US 10,656,914 B2
(45) Date of Patent: *May 19, 2020

(54) METHODS AND INSTRUCTIONS FOR A 32-BIT ARITHMETIC SUPPORT USING 16-BIT MULTIPLY AND 32-BIT ADDITION

(71) Applicant: TEXAS INSTRUMENTS INCORPORATED, Dallas, TX (US)

(72) Inventors: Srinivas Lingam, Dallas, TX (US); Seok-Jun Lee, Allen, TX (US); Manish Goel, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,132

(22) Filed: Aug. 20, 2019

(65) Prior Publication Data

US 2019/0369961 A1 Dec. 5, 2019

Related U.S. Application Data

(63) Continuation of application No. 14/986,349, filed on Dec. 31, 2015, now Pat. No. 10,503,474.

(51) Int. Cl.
 *G06F 7/523* (2006.01)
 *G06F 7/50* (2006.01)
 *G06F 7/53* (2006.01)

(52) U.S. Cl.
 CPC .............. *G06F 7/523* (2013.01); *G06F 7/50* (2013.01); *G06F 7/5324* (2013.01)

(58) Field of Classification Search
 CPC .......... G06F 5/01; G06F 7/4876; G06F 7/523; G06F 7/5324

USPC ................ 708/209, 503, 620, 625
See application file for complete search history.

(56) References Cited

U.S. PATENT DOCUMENTS

| | | |
|---|---|---|
| 5,485,093 A | 1/1996 | Russell et al. |
| 5,734,575 A | 3/1998 | Snow et al. |
| 5,784,585 A | 7/1998 | Denman |
| 5,822,606 A | 10/1998 | Morton |
| 5,835,392 A | 11/1998 | Dulong et al. |
| 5,896,305 A | 4/1999 | Bosshart et al. |
| 5,903,155 A | 5/1999 | Bjorklund |
| 5,920,497 A | 7/1999 | Rim |
| 5,961,575 A | 10/1999 | Hervin et al. |
| 5,978,838 A | 11/1999 | Mohamed et al. |
| 5,983,256 A | 11/1999 | Peleg et al. |
| 6,014,684 A | 1/2000 | Hoffman |

(Continued)

OTHER PUBLICATIONS

Atmel, "AVR201: Using the AVR Hardware Multiplier", 2016 (Year: 2016).*

(Continued)

*Primary Examiner* — Matthew D Sandifer
(74) *Attorney, Agent, or Firm* — Brian D. Graham; Charles A. Brill; Frank D. Cimino (57) ABSTRACT

Instructions for 32-bit arithmetic support using 16-bit multiply and 32-bit addition without a barrel shifter. Illustrative instructions include operations that include receiving a first 32-bit operand, receiving a second 32-bit operand, shifting the second 32-bit operand right 16 or 15 bits to obtain a shifted second 32-bit operand, and adding the shifted second 32-bit operand and the first 32-bit operand to generate a 32-bit sum.

20 Claims, 4 Drawing Sheets

```
{
    long c, c1, c2, c3, c4, c5;

500    c = sign_extend(a[31:16]) * unsigned(b[15:0]);
510    c1 = c + unsigned(a[15:0]) * sign_extend(b[31:16]);
520    c2 = unsigned(a[15:0]) * unsigned(b[15:0]);
530    c3 = shr_addsu(c1, c2);    %c3[31:0] = c1[31:0] + {16'b0, c2[31:16]}
540    c4 = sign_extend(a[31:16]) * sign_extend(b[31:16]);
550    c5 = shr_addss(c4, c3);    %c5[31:0] = c4[31:0] + {15{c3[31]}, c3[31:15]} return c5;
}
```

(56) References Cited

U.S. PATENT DOCUMENTS

| | | |
|---|---|---|
| 6,233,597 B1 | 5/2001 | Tanoue et al. |
| 6,317,820 B1 | 11/2001 | Shiell et al. |
| 6,574,724 B1 | 6/2003 | Hoyle et al. |
| 7,062,526 B1 | 6/2006 | Hoyle |
| 7,236,338 B2 | 6/2007 | Hale et al. |
| 7,281,117 B2 | 10/2007 | Tanaka et al. |
| 7,386,326 B2 | 6/2008 | Sundararajan et al. |
| 7,587,577 B2 | 9/2009 | Royer et al. |
| 7,681,013 B1 | 3/2010 | Trivedi et al. |
| 7,937,559 B1 | 5/2011 | Parameswar et al. |
| 8,065,506 B2 | 11/2011 | Xi et al. |
| 2001/0037352 A1 | 11/2001 | Hong |
| 2002/0198911 A1 | 12/2002 | Blomgren et al. |
| 2003/0196072 A1 | 10/2003 | Chinnakonda et al. |
| 2005/0005180 A1 | 1/2005 | Webster |
| 2005/0144215 A1 | 6/2005 | Simkins et al. |
| 2005/0251644 A1 | 11/2005 | Maher et al. |
| 2008/0071848 A1 | 3/2008 | Baireddy et al. |
| 2008/0133627 A1 | 6/2008 | Langhammer et al. |
| 2008/0141012 A1 | 6/2008 | Yehia et al. |
| 2008/0263285 A1 | 10/2008 | Sharma et al. |
| 2009/0019262 A1 | 1/2009 | Tashiro et al. |
| 2009/0063820 A1 | 3/2009 | Xi et al. |
| 2009/0150654 A1 | 6/2009 | Oberman et al. |
| 2009/0265409 A1 | 10/2009 | Peleg et al. |
| 2010/0191979 A1 | 7/2010 | Zipperer et al. |
| 2010/0211761 A1 | 8/2010 | Dasgupta |
| 2010/0306292 A1 | 12/2010 | Catherwood et al. |
| 2013/0145124 A1 | 6/2013 | Qiu et al. |
| 2014/0280420 A1 | 9/2014 | Khan |
| 2015/0058389 A1 | 2/2015 | Blomgren et al. |
| 2015/0121043 A1 | 4/2015 | Lee et al. |
| 2016/0291974 A1 | 10/2016 | Lingam et al. |
| 2016/0292127 A1 | 10/2016 | Lingam et al. |
| 2017/0060586 A1 | 3/2017 | Lingam et al. |
| 2018/0018298 A1 | 1/2018 | Lingam et al. |

OTHER PUBLICATIONS

MSP Low-Power Microcontrollers, Texas Instruments, www.ti.com/msp, 2015, 41 pgs.

Plant et al., "MSP432 Microcontrollers: Bringing High Performance to Low-Power Applications", Texas Instruments, Mar. 2015, 11 pgs.

Intel, "IA-64 Application Developer's Architecture Guide," May 1999, pp. 7: 154-158; C:16, 18-19, 23 (10 pages).

Hewlett Packard, "PA-RISC 2.0", 1995, pp. 2:18, 7:60, 62 (5 pages).

Texas Instruments, "The MSP430 Hardware Multiplier—Function and Applications", Application Report SLAA042, 1999.

SGC-Thomson Microelectronics, "D950-Core: 16-Bit Fixed Point Digital Signal Processor (DSP) Core", 1997.

\* cited by examiner

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 0 | par_mpy_bfly_ls_ld |||||||||||||||||||||||||||||||
| | 0 | ls : ldstA |||||||||| ld : ld_R ||| m : mpy ||||| b : bfly ||||||||||||
| | | 00 | ld_ARc ||||||| ld_R_rdx2 || 10 | mpy_opn ||||| bfly_opn ||||||||||||
| | | | 0110 | st_A |||||| 0 | 0 | nop ||||| op : bfly_op ||| s1 : mRc | i : t3u || s2 : mRc | i : t3u || d1 : mRc | i : t3u ||
| | | | 0111 | st_ovf_A |||||| 1 | | 11xxx ||||| 000 | ADDC |||||||||||
| | | | 010 | add_ptrs |||||||| | | ||||| 001 | SUBC |||||||||||
| | | | | nop ||||||| | | ||||| 010 | ADDH_SUBL |||||||||||
| | | | | 1xxxxxxxxx |||||||| | | ||||| 011 | SUBH_ADDL |||||||||||
| | | | | | | | | | | | | | | | | | | | | 100 | ADDL |||||||||||
| | | | | | | | | | | | | | | | | | | | | 101 | SUBL |||||||||||
| | | | | | | | | | | | | | | | | | | | | 110 | SHR_ADDSU |||||||||||
| | | | | | | | | | | | | | | | | | | | | 111 | SHR_ADDSS |||||||||||
| | | | | | | | | | | | | | | | | | | | | 11000 ||| minmax |||||||||
| | | | | | | | | | | | | | | | | | | | | 11001 ||| minmax_sh |||||||||
| | | | | | | | | | | | | | | | | | | | | 11010 ||| cmpr |||||||||
| | | | | | | | | | | | | | | | | | | | 10 ||| pass ||||||||||
| | | | | | | | | | | | | | | | | | | | | 111xxxxxxxx |||| nop ||||||||
| | | 11010xxxxxxxxxxxxxxxxxxxxxxxxxxx |||||||||||||||||||||||||||||
| | | | | 11011xxxxxxxxxxxxxxxxxxxxxxxx |||||||||||||||||||| pass ||||||||
| | | | | | | | | | | | | | | | | | | | | | | | | | | | cmpr |||||
| | | | 11100xxxxxxxxxxxxxx |||||||||||||||| load_imm |||||||||||||
| | | | | 10000xxxxxxxxxxxxxxxxxxxxxxxx |||||||||||||| load_zero |||||||||||||
| | | | | | | | | | | | | | | | | | | | | | load_cnt |||||||||||
| | | | | | | | | | | | | | | | | | | | | | doloop |||||||||||
| | | | | | | | return |||||||||||||||||||||||||
| | | 10001xxxxxxxx ||||||||||||||||||||||||||||||
| | | 101xxxxxxxx ||||||||||||||||||||||||||||||
| | | | | 11101xxxxxxxxxxxxxxxxxxxxxxxxxxx |||||||||||||||||||||||||||
| | | | | 110000xxxxxxxx ||||||||||||||||||||||||||||
| | | | | 110001xxxxxxxx ||||||||||||||||||||||||||
| | | | | | | | | | | | | | | | | | | | | | | | | | | | | lshift |||
| | | | | | | | | | | | | | | | | | | | | | | | | | | | | rshift |||

METHODS AND INSTRUCTIONS FOR A 32-BIT ARITHMETIC SUPPORT USING 16-BIT MULTIPLY AND 32-BIT ADDITION

CROSS-REFERENCE TO RELATED APPLICATIONS

This application is a continuation of U.S. patent application Ser. No. 14/986,349, filed Dec. 31, 2015, which is herein incorporated by reference in its entirety.

BACKGROUND

In modern low-power central processing units (CPUs), program instructions are executed in highly specialized execution units in order to achieve low energy consumption. Each execution unit is optimized for the instruction group it executes. In this way, only a minimum number of gates toggle during the execution of an instruction. The other data paths of the CPU remain quiet. One such special instruction group is used to address signal-conditioning operations that use vector computations (FFT, FIR filtering, IIR filtering, etc). Such vector computations can be implemented using an application-specific instruction-set processor (ASIP) targeted for signal conditioning algorithms.

To achieve low-power, the arithmetic supported by certain signal-conditioning ASIPs is targeted for a broad sub-class of applications that mostly require only 16-bit arithmetic. The accelerator hardware defined by the set of instructions in such ASIPs only supports basic operators of 16-bit multiply and 32-bit addition. It would be beneficial to be able to support a full 32-bit arithmetic, such as 32-bit multiply, without significant overhead to the basic 16-bit arithmetic operators/instructions.

SUMMARY

Illustrative embodiments of this disclosure are directed to tangible computer-readable media having stored thereon an executable instruction for performing operations that include receiving a first 32-bit operand, receiving a second 32-bit operand, shifting the second 32-bit operand right 16 bits to obtain a shifted second 32-bit operand, and adding the shifted second 32-bit operand and the first 32-bit operand to generate a 32-bit sum.

Other illustrative embodiments of this disclosure are directed to tangible computer-readable media having stored thereon an executable instruction for performing operations that include receiving a first signed 32-bit operand, receiving a second signed 32-bit operand, shifting the second signed 32-bit operand right 15 bits and filling the first 15 bit positions with the value of the sign bit to obtain a shifted second signed 32-bit operand, and adding the shifted second signed 32-bit operand and the first signed 32-bit operand to generate a 32-bit sum.

Other illustrative embodiments of this disclosure are directed to methods of performing a multiplication of a first signed 32-bit operand and a second signed 32-bit operand using 32-bit architecture. Pursuant to such methods, a signed multiplication of the first 16 bits of the first signed 32-bit operand and the last 16 bits of the second signed 32-bit operand is performed to produce a first 32-bit product. An unsigned multiplication of the last 16 bits of the first signed 32-bit operand and the first 16 bits of the second signed 32-bit operand is performed to produce a second 32-bit product. The first 32-bit product is added to the second 32-bit product to generate a first 32-bit sum. An unsigned multiplication of the last 16 bits of the first signed 32-bit operand and the last 16 bits of the second signed 32-bit operand is performed to produce a third 32-bit product. The third 32-bit product is shifted right 16 bits and the first 16 bit positions are filled with zeroes to obtain a shifted third 32-bit product. The shifted third 32-bit product and the first 32-bit sum are added together to generate a second 32-bit sum. A signed multiplication of the first 16 bits of the first signed 32-bit operand and the first 16 bits of the second signed 32-bit operand is performed to produce a fourth 32-bit product. The second 32-bit sum is right-shifted 15 bits and the first 15 bit positions are filled with the value of the sign bit of the second 32-bit sum to obtain a shifted second 32-bit sum. The shifted second 32-bit sum and the fourth 32-bit product are added together to generate a product of the first and second signed 32-bit operands.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Aspects of the present application can be implemented with respect to an application specific integrated processor (ASIP) architecture that can be provided in the form of a low energy accelerator processor (LEA processor). Such an LEA processor can be optimized for vector computations and arranged to allow a lower gate count than prior known processor accelerator approaches, and can be optimized to provide a lower active power consumption. The arrangements of a low energy accelerator processor can include an optimized instruction set and an architecture optimized for selected vector computations. In addition, the arrangements of a low energy accelerator processor can incorporate an instruction set architecture (ISA) for the LEA processor that is optimized for selected vector oriented computations such as are used in FFT, FIR and IIR computations. In an illustrative LEA processor, address registers and data registers are provided separately. The address registers are non-orthogonal to the execution units, and are arranged to optimize certain vector operations while the connections between the address registers and the various execution units are optimized and/or minimized to reduce silicon area. The data registers are illustratively arranged in a non-orthogonal data register file in a manner which, in combination with the optimized instruction set architecture, provides support for vector operations, yet is implemented with a further reduced gate count and reduced silicon area when compared to fully orthogonal data register files used in prior known processor architectures.

Figure 1:
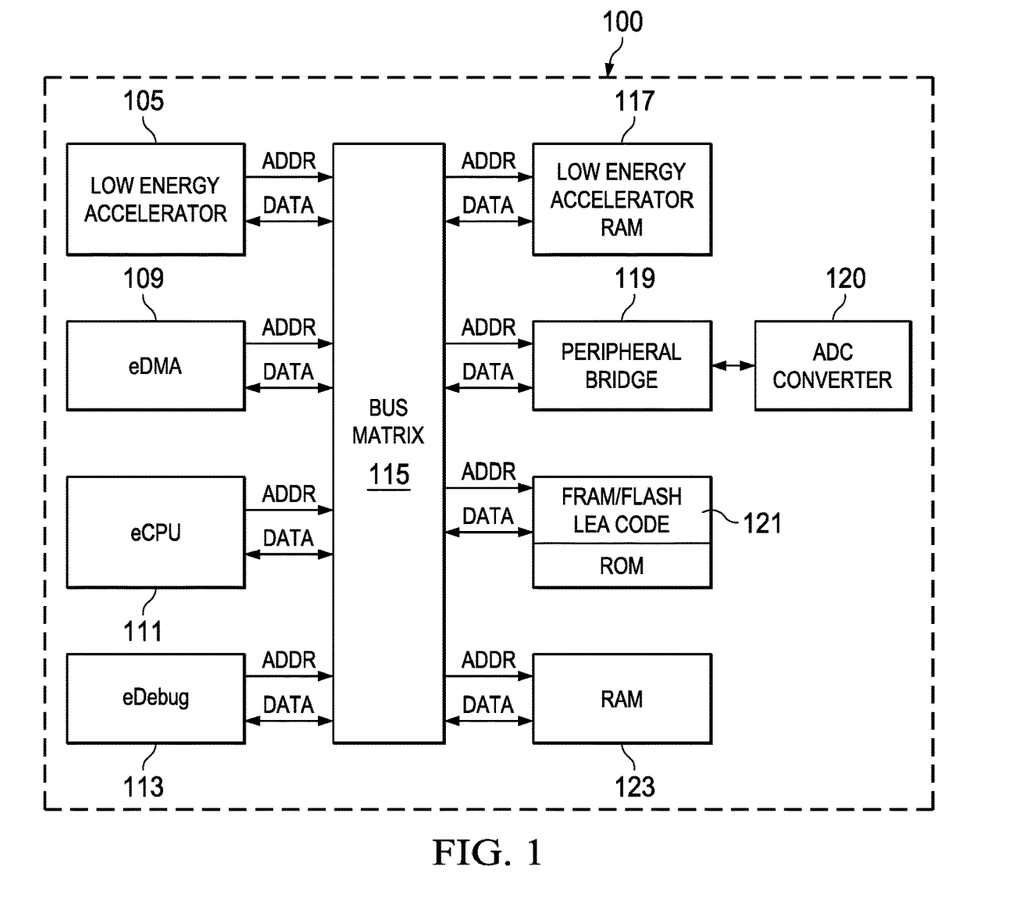
FIG. 1 is a simplified block diagram of an illustrative microcontroller system in which features of the present application can be implemented.

FIG. 1 is a simplified block diagram of an illustrative microcontroller system in which features of the present application can be implemented. In system 100, which can be arranged on a single integrated circuit as a "system on an integrated circuit" (SOIC), or which can be arranged in further alternative approaches as a multiple chip module or circuit board, a bus matrix 115 couples various functional blocks to one another. In this example arrangement, low energy accelerator (LEA) processor 105 is coupled to the bus matrix 115 and incorporates the novel features of the present application. In addition, various additional embedded functional units are provided as part of system 100. An embedded central processor unit (eCPU) 111 is provided to perform general computing tasks and to support various input and output functions, memory accesses, data store and retrieval operations, and communications with external devices. An embedded direct memory access (eDMA) function 100 is coupled to the bus matrix 115 and provides a means to access external memory such as DRAM or FLASH storage outside the system 100. A software debug module (eDebug) 113 can be provided and coupled to the bus matrix 115. Low energy accelerator RAM 117 provides memory for use by the LEA processor 105, for example, embedded RAM such as static RAM (SRAM), dynamic RAM (DRAM) or ferroelectric RAM (FRAM). The LEA processor 105 can use this memory for data storage and for storing intermediate results. Peripheral bridge unit 119 is arranged to couple various additional peripheral units (not shown in FIG. 1, for simplicity) to the bus matrix 115 and thus to the eCPU 111, and/or to the LEA 105. Additional peripheral units such as bus interface units for test bus, scan bus, USB, and other bus interfaces can be coupled to the Peripheral Bridge 119. In addition, various application specific peripheral units such as analog to digital converters (ADC), digital to analog converters (DAC), embedded or external sensors such as gyroscopes, accelerometers, and position sensors can be coupled to the peripheral bridge 119, for example. In FIG. 1, an ADC converter 120 is shown as an example peripheral device. Radio and wireless communications functions such as WiFi, Bluetooth, NFC, and RF and cellular functions can be embedded as additional peripheral units and coupled to the peripheral bridge 119.

In addition, the system 100 can also include non-volatile program storage such as FRAM or FLASH memory for storing code for the LEA in the FRAM/Flash LEA code block 121, which as shown can also include a portion of read only memory (ROM) containing code used for boot-up or start-up program storage. Finally, additional on-board memory, which can be embedded RAM such as SRAM, DRAM or FRAM, is shown as RAM 123.

As is further described below, the LEA processor 105 provides a low power, high performance, programmable vector processing unit that can perform various vector computations independently from the eCPU 111. This allows the eCPU 111 to perform other typical computing tasks while the LEA 105 simultaneously performs vector computations required for certain applications, thereby providing a high performance vector accelerator for system 100. The system 100 can be considered a micro-controller unit (MCU) or, when analog to digital converter peripherals are included, a mixed signal processor (MSP). The various functional blocks in system 100 can be provided, for example, as embedded functions implemented within a single integrated circuit. However, the arrangements of the present application are not limited to a single integrated circuit implementation, and various alternatives include implementing system 100 using multiple chips in a single package, stacked package modules, package on package modules, multi-chip modules, and circuit boards including memory chips, a CPU, and a LEA 105 that can be fabricated as a standalone dedicated integrated circuit or as application specific integrated circuits (ASICs). The LEA 105 can be provided, in one example arrangement, as a completely parameterized ASIP device core for embedding with other known and complete functional cores such as DSPs (digital signal processors), CPUs (central processing units), MPUs (microprocessor units), RISC (reduced instruction set computing) processors, and/or other such cores for use in an ASIC device.

Figure 2:
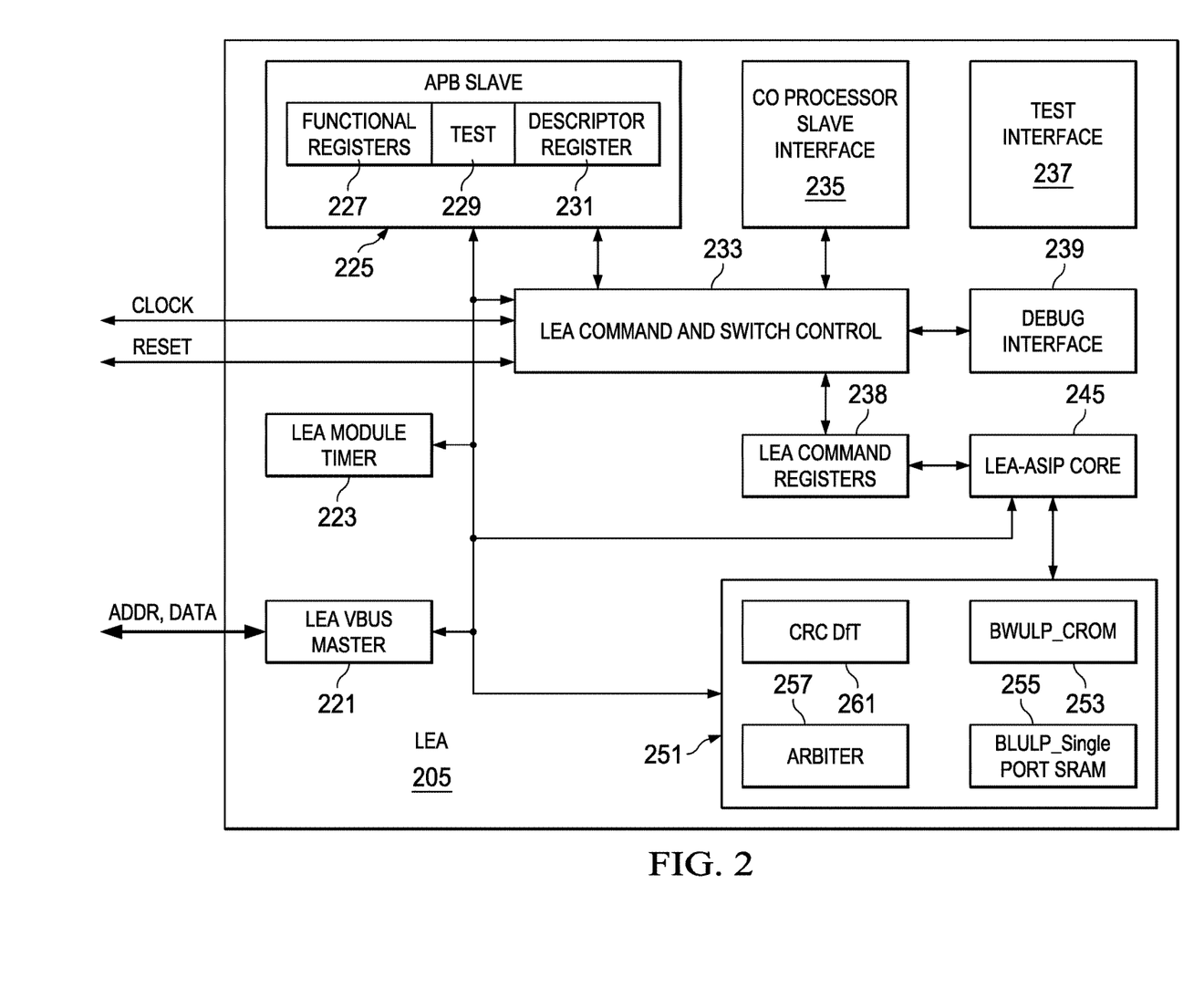
FIG. 2 is a block diagram representing functional blocks used to implement a low-energy-accelerator processor.

FIG. 2 is a block diagram representing functional blocks used to implement an LEA processor such as the LEA processor 105 in FIG. 1. LEA processor 205 includes an LEA command and switch control block 233 that is coupled to a local bus. The local bus is also coupled to an APB (advanced peripheral bus) slave function 225, which is further implemented as a set of functional registers 227, test functions 229 and descriptor register 231. The APB slave 225 provides an interface to additional peripheral devices on an advanced peripheral bus (APB). LEA VBUS master 221 provides an interface to a system bus (such as to the bus matrix 115 of FIG. 1, for example). A set of LEA command registers 238 is coupled to an LEA-ASIP Core 245. "ASIP" is an abbreviation for Application Specific Integrated Processor. The LEA-ASIP core 245 provides the computational core for the LEA 205. A co-processor slave interface 235 couples the LEA processor 205 to a CPU and allows the LEA processor to act as a co-processor. A test interface 237 and debug interface 239 provide additional interfaces for the LEA processor 205. The block 251 provides code ROM 253, a single port SRAM 255, an arbiter 257, and a cyclic redundancy check (CRC) and DfT module 261. The CRC DfT module 261 provides a "design for test" interface to allow self-testing and test operations to be performed. Instruction words for the LEA ASIP core 245 can be stored in the code ROM 253 or, in an alternative embodiment, in the single-port SRAM 255.

In one arrangement, the LEA 205 can be embedded as a core function in an integrated circuit that forms a system such as system 100 in FIG. 1. Alternatively, LEA 205 can be provided as a stand-alone integrated circuit device, or can be packaged with other devices in a multi-chip module, or can be mounted on a circuit board with other components.

In operation, LEA 205 forms a programmable accelerator that is specifically arranged for performing vector computations that are often used in applications with microcontrollers and mixed signal processors. The LEA 205 is arranged to have a small silicon area (low gate count) and to consume low power when compared to prior known solutions. As is further described below, LEA 205 can execute programs using an instruction set tailored to vector operations such as are used for FFTs, FIR, IIR, filtering, vector signal processing and the like.

Figure 3:
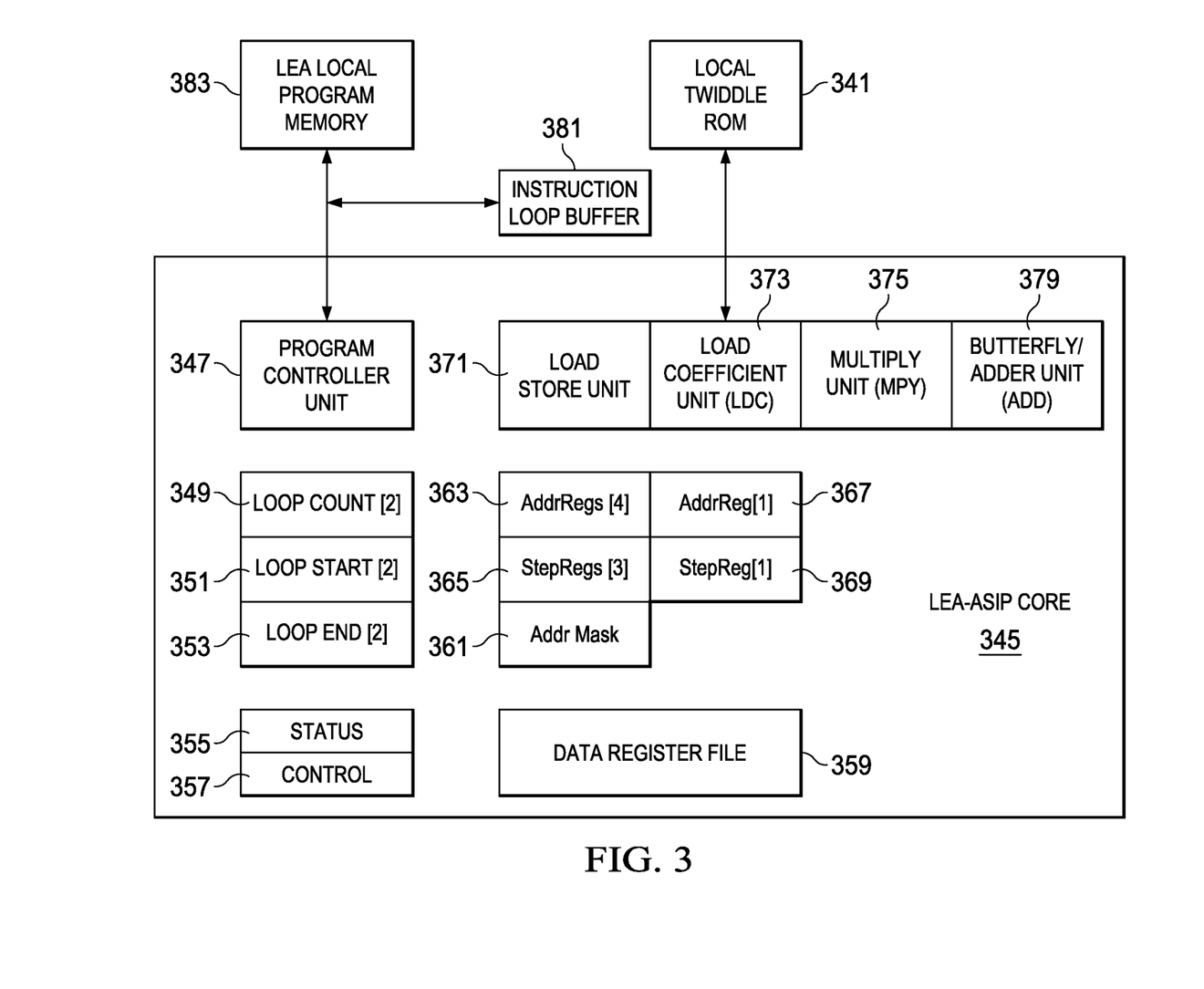
FIG. 3 is a simplified block diagram depicting details of an example low-energy-accelerator application-specific integrated processor core.

FIG. 3 is a simplified block diagram depicting details of an example LEA-ASIP core 345 such as LEA-ASIP core 245 in FIG. 2. The LEA-ASIP core arrangement shown in FIG. 3 provides a processor with four primary functional units 371, 373, 375 and 379 and a program controller unit 347 to execute instructions in the form of parallel instruction words. In the example LEA ASIP core 345 shown in FIG. 3, two simultaneous execution loops, such as an inner "do" loop and an outer "do" loop, are supported by a pair of loop count registers 349, two loop start registers 351, and two loop end registers 353. Status and control registers for the program controller unit (355, 357 respectively) provide additional resources for the program controller. The LEA 345 can fetch instruction words from a local memory, shown as LEA local program memory 383. Loop execution is further supported by the instruction loop buffer 381.

The four execution units are the load store unit 371, the load coefficient unit 373, the multiply unit 375, and the butterfly/adder unit 379. The butterfly/adder unit 379 is an arithmetic logic unit (ALU) arranged to efficiently compute vector operations such as the butterfly computation used in FFT, FIR, BR and DCT vector operations, for example.

Additional resources provided in the example LEA-ASIP core 345 include address registers 363, step registers 365, and an address mask register 361, all of which are coupled to the load store unit 371. In addition, the load coefficient unit 373 is coupled to a separate address register 367, a step register 369, and a local ROM, shown in FIG. 3 as local twiddle ROM 341, for use in providing constants for certain computations. Data register file 359 includes a set of data registers that hold data for use by, and generated by, the four execution units.

Figure 4:
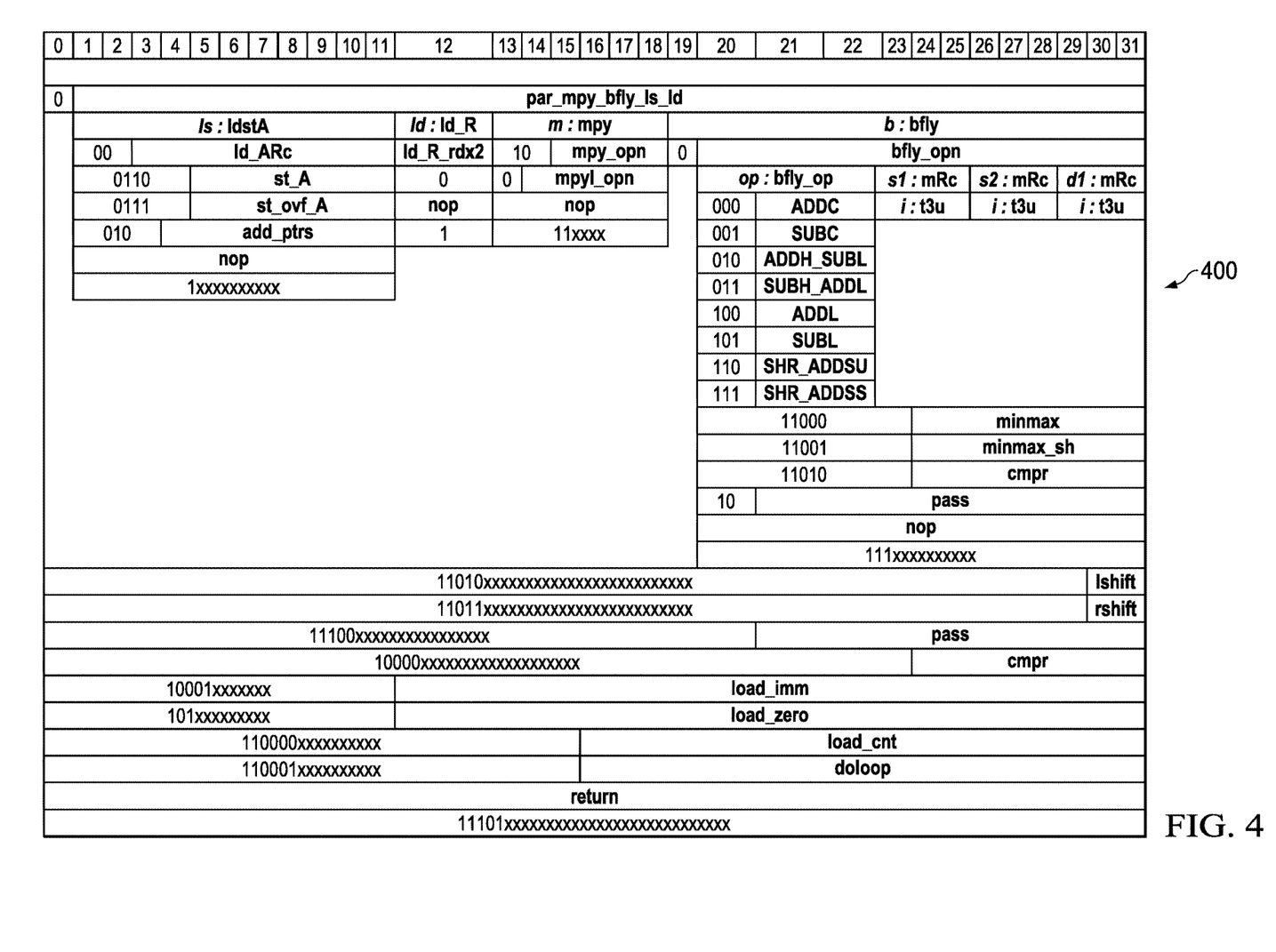
FIG. 4 is a combined opcode encoding chart depicting a summary of an example instruction set architecture (ISA) for a low-energy-accelerator processor arrangement.

FIG. 4 depicts in a combined opcode encoding chart a summary of an example instruction set architecture (ISA) for an LEA processor arrangement. In FIG. 4, the instruction set architecture is shown in chart 400 using an example 32-bit instruction word width. Because the instruction word width is relatively short at 32 bits, the instruction word can be transmitted from a local memory store or a RAM, FRAM or FLASH location using the system data bus width and without the need for a wider bus, and thus without the need for additional driver devices and power to supply the drivers for a wider instruction word. In an alternative approach, the system data bus width can be half the length of the short parallel instruction word, so that two memory accesses can provide an instruction word. In contrast to the very long instruction word (VLIW) architectures of the prior known approaches, which can use an instruction word that is 64, 128 or even 256 bits wide, the arrangements for the low energy accelerator use, in this example, only 32 bits. Matching the instruction word width to the memory bus width, or to twice the memory bus width, results in substantial reduction in the silicon area required and a corresponding reduction in power consumption. It also increases performance because a new instruction word can be fetched each memory cycle or for every two memory cycles. In an alternative arrangement that is also contemplated as providing a further aspect of the present application, the system bus width could be 16 bits, while the short parallel instruction word remains at 32 bits. If the LEA processor is retrieving instruction words from a memory coupled on the system bus in this arrangement, the instruction fetch would require two sequential accesses to memory over the system bus. However in additional arrangements the instruction words can be stored in flash or ROM memory positioned within the LEA processor and having a local bus of 32 bits in width, thereby enabling the LEA processor to retrieve new instruction words each clock cycle.

Although an example ISA arrangement is illustrated in FIG. 4, it should be understood that obvious variations can be made to the example which are still within the scope of the present application and these variations are contemplated by the inventors as forming additional arrangements that are within the scope of the present application and which are covered by the appended claims.

As can be seen by examination of FIG. 4, the instruction word has fields that correspond to the execution units of the LEA as described above. In the example ISA shown in FIG. 4, the first bit, bit 0, is used to distinguish between "1 slot" and "4 slot" instructions. The bits 1-11 of the 32 bit instruction word are used to provide opcodes to the load-store execution unit. In the column labeled "ls: ldstA," a summary of some of the operations for the load store unit are shown with their encoding. A single bit (in this non-limiting example arrangement, bit 12 is used) provides a control field for the load coefficient execution unit. In the column labeled "ld: ld_R," this bit is shown with encoding for certain operations. An opcode field for the multiplier in this example is provided by bits 13-18, and in the column labeled "m: mpy," selected operations are shown for this functional unit with some example encoding. The remaining bits of the instruction word, bits 19-31 in this example arrangement, provide the op-codes for controlling the operations of the butterfly/add ALU execution unit. In the column labeled "b :bfly," some selected operations for this execution unit are shown with their encoding. These operations include a "shift-right add signed/unsigned" instruction, which is designated in FIG. 4 as "SHR_ADDSU," as well as a "shift-right add signed/signed" instruction, which is designated in FIG. 4 as "SHR_ADDSS." These two instructions constitute a novel aspect of the present application.

To achieve low-power, the arithmetic supported by the butterfly/adder ALU 379 of FIG. 3 is targeted for a broad sub-class of applications that mostly require only 16-bit arithmetic. The accelerator hardware defined by the instruction set of the LEA-ASIP core 345 only supports basic operators of 16-bit multiply and 32-bit addition. The SHR_ADDSU instruction and the SHR_ADDSS instruction make use of specific, i.e., fixed, shift amounts in order to support a 32-bit multiply without significant overhead to the basic 16-bit arithmetic operators/instructions. This avoids the need for a full barrel shifter. Barrel shifters are expensive from both a gate-count and energy-consumption perspective.

The "shift-right add signed/unsigned" instruction/operation SHR_ADDSU operates on two 32-bit operands. The first operand is a 32-bit signed value and the second operand is a 32-bit unsigned value. The SHR_ADDSU operation first shifts the second operand (i.e., the unsigned 32-bit value) right 16 bits, filling the 16 most significant bits, i.e., the left-most 16 bit positions, with zeroes. Stated another way, the unsigned 32-bit operand is zero-extended from the upper 16 bits of the 32-bit operand. This shifted 32-bit value is then added to the first operand (i.e., the signed 32-bit value) to produce the result of the SHR_ADDSU operation. In an illustrative embodiment, the first and second operands are stored in and retrieved from first and second data registers, such as data registers in data register file 359 of FIG. 3, and the result of the SHR_ADDSU operation is stored in a third data register. This instruction/operation can be used as part of a sequence of operations that implement a multiplication of two 32-bit values using only 16-bit multiplication functionality, as will be described in further detail below.

The "shift-right add signed/signed" instruction/operation SHR_ADDSS also operates on two 32-bit operands. The first operand is a 32-bit signed value and the second operand is also a 32-bit signed value. The SHR_ADDSS operation first shifts the second operand (i.e., the signed 32-bit value) right 15 bits and fills the 15 vacated bit positions, i.e., the left-most 15 bit positions, with the value of the sign bit of the second operand. Stated another way, the signed 32-bit operand is sign-extended from the upper 15 bits of the 32-bit operand. This shifted 32-bit value is then added to the first operand to produce the result of the SHR_ADDSS operation. In an illustrative embodiment, the first and second operands are stored in and retrieved from first and second data registers, such as data registers in data register file 359 of FIG. 3, and the result of the SHR_ADDSS operation is stored in a third data register. This instruction/operation can be used as part of a sequence of operations that implement a multiplication of two 32-bit values using only 16-bit multiplication functionality, as will be described in further detail below.

Figure 5:
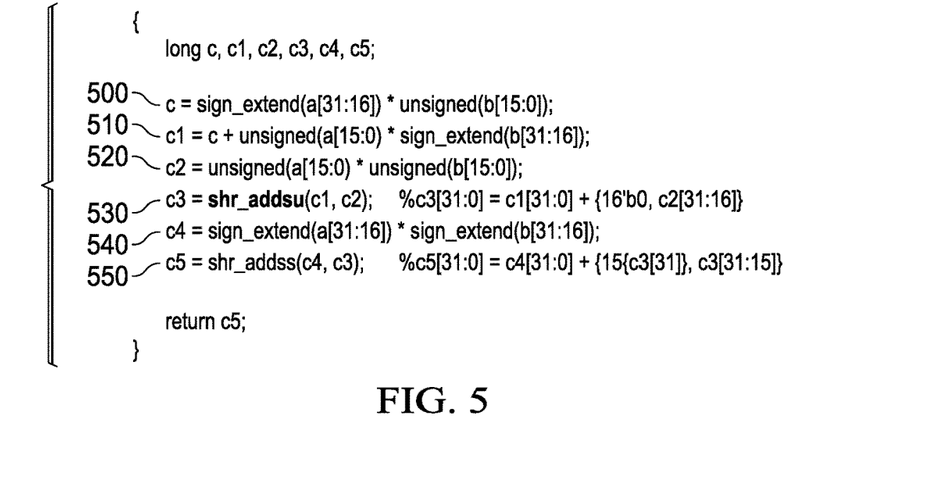
FIG. 5 is a pseudo-code listing of a sequence of operations that implements a multiplication of two 32-bit values using 16-bit architecture.

As mentioned, the SHR_ADDSU and SHR_ADDSS instructions/operations can be used as part of a sequence of operations that implement a multiplication of two 32-bit values using only 16-bit multiplication functionality. FIG. 5 is a pseudo-code listing of such a sequence of operations that implements a multiplication of a first 32-bit signed value "a" and a second 32-bit signed value "b." At line 500, a signed multiplication is performed of the first 16 bits of the 32-bit value a and the last 16 bits of the 32-bit value b and the product is stored in a variable c. Note that the nomenclature "a[31:16]" in FIG. 5 indicates the 16 bits of the 32-bit quantity a from bit position 31 down to bit position 16, i.e., the 16 most significant bits of the 32-bit value a. In an illustrative embodiment, the signed multiplication of line 500 is performed by the multiply unit 375 of FIG. 3. At line 510, an unsigned multiplication is performed of the last (least significant) 16 bits of the 32-bit quantity a and the first (most significant) 16 bits of the 32-bit quantity b. The product of this unsigned multiplication is added to the variable c, i.e., the product of the multiplication performed in line 500, and the 32-bit sum is stored in a variable c1. Illustratively, the multiplication operation of line 510 is performed by the multiply execution unit 375 of FIG. 3 and the addition operation is performed by the butterfly/adder ALU execution unit 379. At line 520, an unsigned multiplication is performed of the last (least significant) 16 bits of the 32-bit quantity a and the last (least significant) 16 bits of the 32-bit quantity b and the 32-bit product stored in a variable c2. Note that when reference is made to storing a value in a variable, this illustratively refers to storing the value in a data register, such as a register in data register file 359 of FIG. 3.

At line 530, the "shift-right add signed/unsigned" instruction SHR_ADDSU described above is executed. The first operand for the SHR_ADDSU instruction is the signed 32-bit value of the variable c1 generated in line 510 and the second operand is the unsigned 32-bit value of the variable c2 generated in line 520. Thus the second operand c2 is right-shifted 16 bits and the vacated bit positions are filled with zeroes. This right-shifted value is then added to the value of variable c2 and the result is stored in variable c3. Note that the nomenclature {16'b0, c2[31:16]} in line 530 of FIG. 5 means sixteen zero bits followed by the bit values of bit positions 31-16 of c2, which is equivalent to the result of right-shifting the value of c2 16 bits and filling the vacated bit positions with zeroes. At line 540, a signed multiplication is performed of the first (most significant) 16 bits of the 32-bit value a and the first (most significant) 16 bits of the 32-bit value b and the product is stored in a variable c4.

At line 550, the "shift-right add signed/signed" instruction SHR_ADDSS described above is executed. The first operand for the SHR_ADDSS instruction is the signed 32-bit value of the variable c4 generated in line 540 and the second operand is the signed 32-bit value of the variable c3 generated by the SHR_ADDSU operation in line 530. Thus the second operand c3 is right-shifted 15 bits and the vacated bit positions are filled with the value of the sign bit of the signed 32-bit value c3. This right-shifted value is then added to the value of variable c4 and the result is stored in variable c5. Note that the nomenclature {15{c3[31]}, c3[31:15]} in line 550 of FIG. 5 means fifteen bits having a value that is equal to the value of bit 31 (the sign bit) of c3, followed by the bit values of bit positions 31-15 of c3, which is equivalent to the result of right-shifting the value of c3 15 bits and filling the vacated bit positions with the value of the sign bit of variable c3.

The final result stored as variable c5 constitutes the product of the multiplication of 32-bit signed value a and 32-bit signed value b.

It is noted that the embodiments disclosed herein are illustrative rather than limiting in nature and that a wide range of variations, modifications, changes, and substitutions are contemplated in the foregoing disclosure. Furthermore, in some instances, some features may be employed without a corresponding use of the other features. Accordingly, it is appropriate that the appended claims be construed broadly and in a manner consistent with the broad inventive concepts disclosed herein.

What is claimed is:

1. A method comprising:
receiving an instruction to multiply a first N-bit operand by a second N-bit operand; and
in response to the instruction:
performing, using a N/2-bit multiplier, multiplication of most significant N/2 bits of the first N-bit operand and least significant N/2 bits of the second N-bit operand to produce a first value;
performing, using the N/2-bit multiplier, multiplication of least significant N/2 bits of the first N-bit operand and most significant N/2 bits of the second N-bit operand to produce a second value;
adding the first value to the second value to produce a third value;
performing, using the N/2-bit multiplier, multiplication of the least significant N/2 bits of the first N-bit operand and the least significant N/2 bits of the second N-bit operand to produce a fourth value;
performing a binary shift of the fourth value to produce a fifth value;
adding the fifth value to the third value to produce a sixth value;
performing, using the N/2-bit multiplier, multiplication of the most significant N/2 bits of the first N-bit operand and the most significant N/2 bits of the second N-bit operand to produce a seventh value;
performing a binary shift of the sixth value to produce an eighth value;
adding the eighth value to the seventh value to produce a ninth value; and
providing the ninth value as a result of the instruction.

2. The method of claim 1, wherein the first N-bit operand and the second N-bit operand are signed.

3. The method of claim 1, wherein the binary shift of the fourth value to produce the fifth value includes performing a right shift of the fourth value by N/2 bits and padding most significant N/2 bits of the shifted fourth value with zeros to produce the fifth value.

4. The method of claim 1, wherein the binary shift of the sixth value to produce the eighth value includes performing a right shift of the sixth value by N/2-1 bits and sign extending the most significant N/2-1 bits of the shifted sixth value to produce the eighth value.

5. The method of claim 1, wherein:
the multiplication of the most significant N/2 bits of the first N-bit operand and the least significant N/2 bits of the second N-bit operand includes sign extending the most significant N/2 bits of the first N-bit operand;
the multiplication of the least significant N/2 bits of the first N-bit operand and the most significant N/2 bits of the second N-bit operand includes sign extending the most significant N/2 bits of the second N-bit operand; and
the multiplication of the most significant N/2 bits of the first N-bit operand and the most significant N/2 bits of the second N-bit operand includes sign extending the most significant N/2 bits of the first N-bit operand and the most significant N/2 bits of the second N-bit operand.

6. The method of claim 5, wherein the multiplication of the least significant N/2 bits of the first N-bit operand and the least significant N/2 bits of the second N-bit operand is unsigned.

7. The method of claim 1, wherein the adding of the first value to the second value, the adding of the fifth value to the third value, and the adding of the eighth value to the seventh value are performed by an N-bit adder.

8. The method of claim 1, wherein:
the performing of the binary shift of the fourth value to produce the fifth value and the adding of the fifth value to the third value are performed by a butterfly adder in response to a first operation; and
the performing of the binary shift of the sixth value to produce the eighth value and the adding of the eighth value to the seventh value are performed by the butterfly adder in response to a second operation.

9. A processor comprising:
a load store unit to load a first operand and a second operand, wherein each of the first operand and the second operand have N bits;
an N-bit adder;
an N/2-bit multiplier; and
a program controller configured to, in response to an instruction to multiply the first operand by the second operand:
control the N/2-bit multiplier to multiply most significant N/2 bits of the first operand and least significant N/2 bits of the second operand to produce a first product;
control the N/2-bit multiplier to multiply least significant N/2 bits of the first operand and most significant N/2 bits of the second operand to produce a second product;
control the N-bit adder to add the first product to the second product to produce a first sum;
control the N/2-bit multiplier to multiply the least significant N/2 bits of the first operand and the least significant N/2 bits of the second operand to produce a third product;
control the N-bit adder to shift the third product and to add the first sum to the shifted third product to produce a second sum;
control the N/2-bit multiplier to multiply the most significant N/2 bits of the first operand and the most significant N/2 bits of the second operand to produce a fourth product; and
control the N-bit adder to shift the second sum and to add the fourth product to the shifted second sum to produce a result of the instruction to multiply the first operand and the second operand.

10. The processor of claim 9, wherein the first operand and the second operand are signed.

11. The processor of claim 9, wherein the program controller is configured to control the N-bit adder to shift the third product right by N/2 bits and to pad most significant N/2 bits of the shifted third product with zeros.

12. The processor of claim 9, wherein the program controller is configured to control the N-bit adder to shift the second sum right by N/2-1 bits and to sign extend most significant N/2-1 bits of the shifted second sum.

13. The processor of claim 9, wherein the program controller is configured to:
control the N/2-bit multiplier to multiply the most significant N/2 bits of the first operand and the least significant N/2 bits of the second operand by sign extending the most significant N/2 bits of the first operand;
control the N/2-bit multiplier to multiply the least significant N/2 bits of the first operand and the most significant N/2 bits of the second operand by sign extending the most significant N/2 bits of the second operand; and
control the N/2-bit multiplier to multiply the most significant N/2 bits of the first operand and the most significant N/2 bits of the second operand by sign extending the most significant N/2 bits of the first operand and the most significant N/2 bits of the second operand.

14. The processor of claim 9, wherein the program controller is configured to control the N/2-bit multiplier to perform unsigned multiplication to multiply the least significant N/2 bits of the first operand and the least significant N/2 bits of the second operand to produce the third product.

15. A processor comprising:
an application specific integrated processor core that includes:
an adder configured to add two numbers of N bits;
a multiplier configured to multiply two numbers of N/2 bits; and
a program controller configured to, in response to an instruction to multiply a first operand having N bits by a second operand having N bits:
control the multiplier to multiply most significant N/2 bits of the first operand and least significant N/2 bits of the second operand to produce a first product;
control the multiplier to multiply least significant N/2 bits of the first operand and most significant N/2 bits of the second operand to produce a second product;
control the adder to add the first product to the second product to produce a first sum;
control the multiplier to multiply the least significant N/2 bits of the first operand and the least significant N/2 bits of the second operand to produce a third product;
shift the third product and control the adder to add the first sum to the third product to produce a second sum;
control the multiplier to multiply the most significant N/2 bits of the first operand and the most significant N/2 bits of the second operand to produce a fourth product; and
shift the second sum and control the adder to add the fourth product to the shifted second sum to produce a result of the instruction to multiply the first operand and the second operand.

16. The processor of claim 15, wherein the adder is a butterfly adder and the program controller is configured to control the butterfly adder to perform the shift of the third product and to perform the shift of the second sum.

17. The processor of claim 15, wherein the shift of the third product includes a binary shift right of the third product by N/2 bits and zero extension of the shifted third product.

18. The processor of claim 17, wherein the shift of the second sum includes a binary shift right of the second sum by N/2-1 bits and sign extension of the shifted second sum.

19. The processor of claim 15, wherein the first operand and the second operand are signed.

20. The processor of claim 15, wherein the program controller is configured to:
　control the multiplier to multiply the most significant N/2 bits of the first operand and the least significant N/2 bits of the second operand by sign extending the most significant N/2 bits of the first operand;
　control the multiplier to multiply the least significant N/2 bits of the first operand and the most significant N/2 bits of the second operand by sign extending the most significant N/2 bits of the second operand; and
　control the multiplier to multiply the most significant N/2 bits of the first operand and the most significant N/2 bits of the second operand by sign extending the most significant N/2 bits of the first operand and the most significant N/2 bits of the second operand.

\* \* \* \* \*